United States Patent [19]

Horn et al.

[11] 4,153,784

[45] May 8, 1979

[54] NYLON COPOLYMER FROM PIPERAZINE, ALIPHATIC DIAMINE AND MIXTURE OF ALIPHATIC DIACIDS

[75] Inventors: Peter Horn, Hirschberg; Franz Leppmeier, Lugwigshafen; Guenter Eckert, Limburgerhof; Karl Fischer, Bad Duerkheim, all of Fed. Rep. of Germany

[73] Assignee: BASF Aktiengesellschaft, Ludwigshafen, Fed. Rep. of Germany

[21] Appl. No.: 810,198

[22] Filed: Jun. 27, 1977

[30] Foreign Application Priority Data

Jul. 5, 1976 [DE] Fed. Rep. of Germany ....... 2630114

[51] Int. Cl.$^2$ .............................................. C08G 69/26

[52] U.S. Cl. ................. 528/338; 260/30.8 R; 260/32.8 N; 260/33.2 R; 260/33.4 R; 260/33.6 R; 428/474; 528/341; 528/346; 528/349

[58] Field of Search .............. 260/78 R; 528/338, 341

[56] References Cited

U.S. PATENT DOCUMENTS 2,130,948   9/1938   Carothers ......................... 260/78 R

*Primary Examiner*—Harold D. Anderson
*Attorney, Agent, or Firm*—Keil & Witherspoon

[57] ABSTRACT

Nylon copolymer containing piperazine and a process for finishing leather and imitation leather, having a surface of polyurethane or plasticized PVC, by applying a solution of this nylon copolymer and drying it. The overall properties of the finish are better then those of conventional finishes.

5 Claims, No Drawings

NYLON COPOLYMER FROM PIPERAZINE, ALIPHATIC DIAMINE AND MIXTURE OF ALIPHATIC DIACIDS

The present invention relates to a new nylon copolymer containing piperazine and to a process for finishing leather and imitation leather, having a surface polyurethane or plasticized PVC, by applying a solution of this nylon copolymer and drying it. The overall properties of the finish are better than those of conventional finishes.

Imitation leather is essentially manufactured by coating fabrics or nonwovens of cotton or synthetic fibers with a polymer which is frequently a polyurethane or plasticized polyvinyl chloride. This in itself however no longer suffices for present-day market requirements. To meet these, it requires a finish, i.e. a surface treatment, which conforms to fashion requirements, i.e. which exhibits, for example, cloud effects or other multi-colored patterns and the sensory properties of which are similar to, or at least comparable with, those of natural leather. In addition, the product has to have improved physical properties, e.g. rub-resistance, resistance to flexing, and gloss. Naturally, the finish must adhere well and durably to the base. Further, the solutions, in the form of which the finish is marketed, must be stable on storage, i.e. they must not gel gradually.

The conventional finishes conform to these requirements to a greater or lesser extent.

However, great difficulties frequently arise if leather is used together with imitation leather or different color, or if several imitation leathers of different color are used together, since plasticizers, dyes and organic pigments which are somewhat soluble tend to migrate or bleed.

The polymers and copolymers based on methyl methacrylate hitherto used for finishing the imitation leathers only partially prevent the migration of plasticizers, dyes and pigments. It is true that pure polymethyl methacrylates are a good migration barrier, but the other important physical properties of such a finish, e.g. flexibility and adhesion, are inadequate. If attempts are made to improve these properties by copolymerization with other monomers, e.g. ethyl acrylate or butyl acrylate, the barrier action is substantially lost.

Most conventional finishes, e.g., surface-coatings based on nitrocellulose, urea-formaldehyde condensates, cellulose acetobutyrate (CAB), vinyl chloride polymers and others, exhibit an inadequate barrier action, if any, against the migration of dyes and plasticizers. Furthermore, their hand is in most cases reminiscent of a plastic.

Another possible approach is to finish leather and imitation leathers with reactive or non-reactive polyurethane surface-coatings. As far as these coatings are concerned, difficulties arise particularly with regard to adequate adhesion to plasticized polyvinyl chloride; in addition, the tactile properties, i.e. the hand, frequently do not conform to the market requirement that an imitation leather should be as leather-like as possible. Above all, polyurethane coatings do not exhibit an adequate barrier action, if any.

The nylon surface-coatings hitherto disclosed as such finishes either form stable solutions or the coating produced therewith is a good barrier to migration, but they are unable to provide both these properties simultaneously. Those which give stable solutions include, above all, the nylons based on dimerized fatty acid as described, for example, in U.S. Pat. Nos. 2,450,940 and 2,840,264. The second group, which admittedly has a good migration barrier action but does not form stable solutions, essentially includes the conventional nylon copolymers which contain co-polycondensed cycloaliphatic diamines. Their solutions tend to gel on storage.

Nylon copolymers of a simple composition, e.g. those obtained from about equal parts of hexamethylenediamine adipate and caprolactam, form neither storage-stable solutions nor coatings which adequately retard or prevent migration.

In addition to at least one of the above disadvantages, most of the nylon surface-coatings available on the market have poor water resistance and give a hard surface after drying. Furthermore, they frequently present difficulties in respect of their elasticity and adhesion to flexible bases.

Polyglutamate solutions have the disadvantage that they can only be applied from chlorohydrocarbons and hence represent a particular toxicological problem for the processor. In addition, they have the disadvantage that adequate adhesion can only be achieved with difficulty.

It is an object of the present invention to provide a finish for leather and imitation leather having a polyvinyl chloride or polyurethane surface, which finish fulfils all requirements simultaneously. The finish is required to give storage-stable solutions with the conventional solvent mixtures, to adhere firmly and durably to the base, to impart to the latter good tactile properties (hand), optical properties (gloss) and mechanical properties and to prevent migration of plasticizers and dyes.

We have found that this object is achieved by providing a nylon copolymer of (a) from 5 to 15, preferably from 6 to 12, percent by weight of a slat of adipic acid and an aliphatic or cycloaliphatic primary diamine with from 5 to 20, preferably from 6 to 15 carbon atoms, and (b) from 95 to 85, preferably from 94 to 88, percent by weight of a salt of piperazine and a mixture of decanedicarboxylic acid and azelaic acid in the molar ratio of from 70:30 to 95:5, preferably from 80:20 to 92:8, having a K value, measured by the method of H. Fikentscher, Cellulosechemie 13 (1932), 58–64 and 21–74, at 20° C. in 1% strength solution in 96% strength sulfuric acid, of from 40 to 65, preferably from 42 to 50, and providing a process for finishing leather and imitation leather, having a surface of polyurethane or plasticized polyvinyl chloride, by using a solution of such a nylon copolymer in a conventional solvent mixture.

Such a finish for the first time meets all the above requirements simultaneously. Even slight changes, either in respect of the nature of the components or in respect of their ratio, lead to severe shortcomings in respect of one or other property, so that the balanced combination of properties achieved according to the invention is lost.

The nylon copolymers may be manufactured in accordance with conventional methods by melt polycondensation of the components at from 180 to 300, preferably from 200° to 280° C., in the presence or absence of traces of a monofunctional carboxylic acid, e.g. stearic acid or propionic acid, as a molecular weight regulator, and with removal of the water of reaction.

Examples of suitable aliphatic or cycloaliphatic primary diamines of the nylon copolymer component (a) are polymethylenediamines of from 5 to 20 carbon atoms, especially pentamethylenediamine, hexamethylenediamine, octamethylenediamine, nonamethylenediamine, decamethylenediamine, undecamethylenediamine, dodecamethylenediamine, and nonadecanediamine, substituted linear diamines, such as 2,2,4- and 2,4,4-trimethylhexamethylenediamine, and cycloaliphatic diamines, such as 4,4'-diaminodicyclohexylmethane, 3,3'-dimethyl-4,4'-diaminodicyclohexylmethane, 4,4'-di-(aminodicyclohexyl)-2,2-propane and 1,4-di-(aminomethyl)-cyclohexane.

The solvents in which the nylon copolymers to be used according to the invention are employed are generally the conventional solvents for nylon copolymers, i.e. mixtures of those organic polar solvents which form stable solutions of at least from 10 to 20 percent strength by weight with the nylon copolymers, do not react with the nylons and the base under storage and coating conditions and are sufficiently low-boiling to ensure rapid drying. Advantageously, they should not boil below 60° C. and not above 150° C. under standard pressure. Examples of suitable components of the mixture are aromatics, e.g. benzene, toluene and xylenes, preferably toluene; alcohols, e.g. methanol, ethanol, n- and i-propanol and the isomeric butanols and pentanols, isomerized octanols, e.g. 2-ethyl-hexanol, and cycloalkanols, e.g. cyclopentanol and cyclohexanol, as well as glycols, e.g. ethylene glycol, etheralcohols, e.g. ethylglycol (ethylene glycol monoethyl ether) and ketones, e.g. methyl ethyl ketone and cyclohexanone. It is preferred to use mixtures of about equal parts of methanol and toluene or a ternary mixture of one or more of the above n-alkanols, cyclohexanol and toluene. Depending on the intended method of application (for example spraying or printing) and the thickness to be applied, lower-boiling or (to avoid drying on the printing roller) somewhat higher-boiling mixtures may be used.

The nylon copolymers are marketed as a solution of from 5 to 25, preferably from 8 to 20, percent by weight. These solutions are outstandingly stable on storage, i.e. they do not gel even at fairly low temperatures and over prolonged periods, and instead retain their viscosity unchanged and do not form any precipitates. Before they are used, they are generally diluted with the same solvents, or other conventional solvents, to from 2 to 6 times their volume. For spraying, a concentration of about 2 to 20, and for printing, one of about 20 percent by weight may be chosen.

The solutions can be colored by adding conventional inorganic or organic pigment formulations or conventional soluble dyes. Suitable pigment formulations are restricted to those of which the binder is soluble in the nylon solutions and compatible with the dissolved nylon copolymers, i.e. does not form any precipitates with the latter; for example, such formulations are based on vinyl chloride/vinyl acetate copolymers or on nylon copolymers. Organic pigments which, because of a certain degree of solubility in organic media, tend to migrate, are, for example, laked azo pigments, e.g. Lake Red C (C.I. No. 15,585), or non-laked azo pigments, e.g. Hansa Yellow G (C.I. 11,680), Hansa Yellow 10 G (C.I. 11,710), Hansa Scarlet RN (C.I. 12,120) and Permanent Red EGR (C.I. 12,370).

Examples of suitable soluble dyes are 1:1 or 1:2 metal complexes of azo dyes. If special effects are desired, other conventional materials may of course also be added to the nylon copolymer solutions, e.g. delustering agents or additives which affect the hand (of the coated material).

The solutions for finishing leather and imitation leather may be applied in the conventional manner, i.e. by knife-coating, casting or, preferably, spraying, above all with a spray gun, or printing, e.g. with engraved rollers. As a rule, from 3 to 25, preferably from 5 to 15, g of nylon copolymer/$m^2$ of base are applied. The material is then dried in the conventional manner. For this, from 1 to 2 minutes at from 70° to 80° C. in a drying tunnel in general suffice; however, the material can, for example, also be dried by festooning at room temperature.

The finishes thus achieved exhibit a pleasant, soft, leather-like hand and the finished leather or polyvinyl chloride- or polyurethane-based leather substitute can be subjected to mechanical stresses without causing the finish to detach or abrade, i.e. it is fast to wet crocking, dry crocking, and behaves elastically when flexed wet or dry; furthermore, the finish reliably prevents any migration of plasticizers, dyes or organic pigments to the surface, i.e. it prevents the surface from becoming tacky and the base from embrittling, and in particular prevents bleeding of the dyes or pigments at the interface between two bases of different color. Finally, the nylon copolymers of the invention, and the finishes manufactured therefrom, are light-fast and can be welded by high-frequency methods.

In the Examples, parts and percentages are by weight.

EXAMPLE 1

200 parts of a nylon having a K value of 42, obtained from 10% of hexamethylenediamine adipate and 90% of the piperazine salt of a mixture of decane-1,10-dicarboxylic acid and azelaic acid in the molar ratio of 4:1, are dissolved in a mixture of 400 parts of methanol and 400 parts of toluene.

100 parts of this solution are mixed in the weight ratio of 1:3 with a diluent mixture consisting of 30% of methanol, 50% of ethanol and 20% of methyl ethyl ketone, and then applied by spraying onto a cotton fabric coated with plasticized PVC.

The amount applied is 10 g of solids/$m^2$.

The finished material exhibits a high gloss and a smooth, leathery hand.

Mechanical properties:

Bally flexometer test (flexing endurance) according to IUP 20:

After 200,000 flexes at normal temperature and 20,000 flexes at −10° C., the specimens remain undamaged.

Dry and wet rub resistance according to IUF 450:

After 1,000 dry strokes and 300 wet strokes no damage is observed.

The adhesion is very good; the protective finish does not become detached on flexing and rubbing under the conditions of the above test. The finish is impermeable to plasticizer and therefore exhibits no tackiness and no blotchiness even after 3 days' storage at 80° C.

Adhesive tape test (in this, an adhesive tape is stuck on the finished base and then torn off; the finish film must not detach): fully satisfactory.

Diffusion resistance test according to IUF 442:

Absolutely resistant to diffusion (rating 5 on the DIN 54,002 grey scale)

EXAMPLE 2

200 parts of a nylon copolymer having the composition described in Example 1, but having a K value of 46, are dissolved in a mixture of 500 parts of methanol and 300 parts of toluene. 120 parts of this solution are stirred with 20 parts of a 5% strength solution of the dye Solvent Red 118, C.I. 15,675 (Conversion Product) in cyclohexanol and the mixture is printed by means of a gravure roller onto a nylon nonwoven coated with plasticized PVC. The amount applied is 5 g/m².

The material shows the same test results as the sample obtained as described in Example 1, except for the diffusion resistance. To achieve the latter, a second, colorless layer of the same nylon copolymer must be applied on top of the colored layer.

EXAMPLE 3

Composition of the nylon copolymer: 6 percent by weight of hexamethylenediamine adipate, and 94 percent by weight of the piperazine salt of a mixture of decane-1,10-dicarboxylic acid and azelaic acid in the molar ratio of 92:8.

The K value is 43.

180 parts of the nylon copolymer are dissolved in a mixture of 370 parts of methanol and 450 parts of toluene.

80 parts of this solution are mixed, in the weight ratio of 1:2, with a diluent mixture consisting of 30% of ethanol, 30% of toluene, 30% of methyl ethyl ketone and 10% of ethylene glycol and then applied by spraying onto a PVC-coated polyester nonwoven. The amount applies is 15 g of solids/m².

The finished material gives the same test results as in Example 1.

EXAMPLE 4

Composition of the nylon copolymer: 10 percent by weight of the salt of adipic acid and 4,4'-diaminodicyclohexyl-2,2-propane and 90 percent by weight of the piperazine salt of a mixture of decane1,10-dicarboxylic acid and azelaic acid in the molar ratio of 80:20.

The K value is 49.

220 parts of the nylon copolymer are dissolved in a mixture of 440 parts of methanol, 260 parts of toluene and 80 parts of ethanol and printed by means of a gravure roller onto a cotton fabric coating with plasticized PVC. The amount applied is 12 g/m².

The material gives the same test results as the sample obtained as described in Example 1.

EXAMPLE 5

200 parts of the nylon copolymer having a K value of 47 and prepared from 12 percent by weight of hexamethylenediamine adipate and 88 percent by weight of the piperazine salt of a mixture of decane-1,10-dicarboxylic acid and azelaic acid in the molar ratio of 85:15 are dissolved in a mixture of 400 parts of methanol, 350 parts of toluene and 50 parts of ethanol. A diluent mixture of 40 parts of methanol, 40 parts of ethanol, 15 parts of methyl ethyl ketone and 5 parts of ethyl is added to 100 parts of the above solution in a weight ratio of 1:2, and the resulting mixture is sprayed by means of an air spray gun onto leather primed with an acrylate dispersion. The amount applied is 12 g of solid per m². The napa leather finished in this way has the following properties:

Smooth hand, beautiful gloss.
Mechanical properties:
(1) Bally flexometer test (IUP 20): After 50,000 flexes the specimens do not show any damage.

(2) Dry and wet rub resistance (IUF 450): After 1,000 dry stokes and 300 wet strokes no damage is observed.

(3) Adhesion according to IUF 470: The adhesion values are about 400 p/cm.

(4) Diffusion resistance test according to IUF 442: Rating 3–4 on the DIN 54,002 grey scale.

EXAMPLE 6

Composition of the nylon copolymer: 4 percent by weight of hexamethylenediamine adipate, 4 percent by weight of the salt of adipic acid and 4,4'-diaminodicyclohexyl-2,2-propane, and 92 percent by weight of the piperazine salt of a mixture of decane-1,10-dicarboxylic acid and azelaic acid in the molar ratio 80:20. K value: 48.

180 parts of this polyamide are dissolved in a mixture of 420 parts of methanol, 350 parts of toluene and 50 parts of isobutanol and printed by means of an engraved roller onto a nonwoven laminated with a polyurethane film. The amount applied is 6 g of solid per m².

The initation leather coated in this way has a high gloss and a pleasant hand.

Mechanical properties:
(1) Bally flexometer test (IUP 20): Slight damage after 100,000 flexes.

(2) Dry and wet rub resistance: After 100,000 dry strokes and 100 wet strokes no damage is observed.

COMPARATIVE EXAMPLE 1

Colorless finish, using a nylon copolymer of qualitatively different composition, on a cotton nonwoven coated with plasticized PVC.

Composition of the nylon copolymer: 90 percent by weight of the piperazine salt of decane-1,10-dicarboxylic acid and 10 percent by weight of the 1-(2-aminoethyl)-piperazine salt of adipic acid.

The K value is 47.

200 parts of the nylon are dissolved in a mixture of 380 parts of methanol and 420 parts of toluene. 120 parts of this solution are mixed in the weight ratio of 1:2.5 with a diluent mixture consisting of 20 parts of methanol, 40 parts of ethanol and 40 parts of methyl ethyl ketone and then applied by spraying onto the imitation leather described above.

The amount applied is 20 g of solids/m².

The finished material dries matt and grey and the finish can easily be abraded because of inadequate adhesion.

COMPARATIVE EXAMPLE 2

Colorless finish, using a nylon copolymer of qualitatively different composition, on a cotton nonwoven coated with plasticized PVC (in principle resembling Comparative Example 1):

Composition: 90 percent by weight of the piperazine salt of decane-1,10-dicarboxylic acid and 10 percent by weight of the 3,3'-dimethyl-4,4'-diamino-dicyclohexylmethane salt of adipic acid.

The K value is 39.

200 parts of the nylon are dissolved in a mixture of 380 parts of methanol and 420 parts of toluene.

150 parts of this solution are mixed in the weight ratio of 1:2 with a diluent mixture consisting of 30 parts of ethanol, 30 parts of methyl ethyl ketone, 35 parts of toluene and 5 parts of ethylene glyol and then applied by spraying onto the base.

The amount applied is 15 g of solids/m².

The finished material has the following properties: as the finish dries on the PVC base, a white, opaque film forms, which detaches from the PVC on simple flexing.

COMPARATIVE EXAMPLE 3

Colorless finish, using a nylon copolymer of quantitatively different composition, on a synthetic fiber nonwoven coated with plasticized PVC.

Composition of the nylon copolymer: (a) 20 percent by weight of hexamethylenediamine adipate and (b) 80 percent by weight of the piperazine salt of a mixture of 60 equivalents of decane-1,10-dicarboxylic acid and 40 equivalents of azelaic acid.

The K value is 47.

The material is dissolved, and used, as described in Example 1.

Properties: on drying the nylon finish on the PVC material, a film which adheres weakly and lifts off the base on simple flexing is obtained.

We claim:

1. A nylon copolymer having a K value of from 40 to 65 measured by the method of H. Fikentscher at 20° C. in 1% strength solution in 96% strength sulfuric acid, said copolymer being manufactured from
   (a) 5 to 15 percent by weight of a salt of adipic acid and an aliphatic or cycloaliphatic primary diamine containing from 5 to 20 carbon atoms and
   (b) 95 to 85 percent by weight of the piperazine salt of a mixture of decane-1,10-dicarboxylic acid and azelaic acid in the molar ratio respectively of from 70:30 to 95:5.

2. A nylon copolymer having a K value of from 40 to 65 measured by the method of H. Fikentscher at 20° C. in 1% strength solution in 96% strength sulfuric acid, said copolymer being manufactured from
   (a) 6 to 12 percent by weight of a salt of adipic acid and an aliphatic or cycloaliphatic primary diamine containing from 5 to 20 carbon atoms and
   (b) 94 to 88 percent by weight of the piperazine salt of a mixture of decane-1,10-dicarboxylic acid and azelaic acid in the molar ratio respectively of from 70:30 to 95:5.

3. A nylon copolymer having a K value from 40 to 65 measured by the method of H. Fikentscher at 20° C. in 1% strength solution in 96% strength sulfuric acid, said copolymer being manufactured from
   (a) 5 to 15 percent by weight of a salt of adipic acid and an aliphatic or cycloaliphatic primary diamine containing from 5 to 20 carbon atoms and
   (b) 95 to 85 percent by weight of the piperazine salt of a mixture of decane-1,10-dicarboxylic acid and azelaic acid in the molar ratio respectively of from 80:20 to 92:8.

4. A nylon copolymer having a K value from 40 to 65 measured by the method of H. Fikentscher at 20° C. in 1% strength solution in 96% strength sulfuric acid, said copolymer being manufactured from
   (a) 6 to 12 percent by weight of a salt of adipic acid and an aliphatic or cycloaliphatic primary diamine containing from 5 to 20 carbon atoms and
   (b) 94 to 88 percent by weight of the piperazine salt of a mixture of decane-1,10-dicarboxylic acid and azelaic acid in the molar ratio respectively of from 80:20 to 92:8.

5. A nylon copolymer having a K value of from 42 to 50 measured by the method of H. Fikentscher at 20° C. in 1% strength solution in 96% strength sulfuric acid, said copolymer being manufactured from
   (a) 6 to 12 percent by weight of a salt of adipic acid and an aliphatic or cycloaliphatic primary diamine containing from 5 to 20 carbon atoms and
   (b) 94 to 88 percent by weight of the piperazine salt of a mixture of decane-1,10-dicarboxylic acid and azelaic acid in the molar ratio respectively of from 80:20 to 92:8.

* * * * *